(12) United States Patent
Vasichek

(10) Patent No.: US 6,855,890 B1
(45) Date of Patent: Feb. 15, 2005

(54) BRACKETS AND METHODS FOR HOLDING WIRES UTILIZING MAGNETIC FORCE

(76) Inventor: Richard Vasichek, 11447-56th St. NE., Brocket, ND (US) 58321-9643

( * ) Notice: Subject to any disclaimer, the term of this patent is extended or adjusted under 35 U.S.C. 154(b) by 0 days.

(21) Appl. No.: 10/624,623

(22) Filed: Jul. 22, 2003

(51) Int. Cl.[7] .............................. H01B 7/04; F16L 3/00
(52) U.S. Cl. ............... 174/135; 174/138 G; 174/138 R; 248/49; 248/65; 248/467
(58) Field of Search ............................ 174/135, 138 G, 174/138 R, 163 R, 166 S; 248/49, 65, 467

(56) References Cited

U.S. PATENT DOCUMENTS

| | | | |
|---|---|---|---|
| 921,108 A | | 5/1909 | Hauss |
| 2,977,082 A | | 3/1961 | Harris |
| 3,189,310 A | | 6/1965 | Trueson |
| 3,190,599 A | * | 6/1965 | Margulis ................ 248/205.3 |
| 3,245,165 A | | 4/1966 | Podoloff |
| 3,325,639 A | | 6/1967 | King |
| 3,713,614 A | | 1/1973 | Taylor |
| 3,848,227 A | * | 11/1974 | Helm .......................... 340/473 |
| 3,970,837 A | | 7/1976 | Helm |
| 4,287,676 A | | 9/1981 | Weinhaus |
| 4,422,137 A | | 12/1983 | Watts |
| 4,454,569 A | | 6/1984 | Maguire |
| 4,565,526 A | * | 1/1986 | Kawata et al. .................. 433/8 |
| 4,965,708 A | | 10/1990 | Louis |
| 5,031,874 A | | 7/1991 | Shannon |
| 5,039,047 A | | 8/1991 | Pitzo |
| 5,311,414 A | | 5/1994 | Branham, Sr. |
| 5,357,054 A | * | 10/1994 | Beckerich .................... 174/48 |
| 6,155,523 A | * | 12/2000 | Pitre ......................... 248/467 |
| 6,305,656 B1 | | 10/2001 | Wemyss |
| 6,305,819 B1 | | 10/2001 | Chen |
| 6,328,459 B1 | | 12/2001 | Adams |
| 6,388,548 B1 | * | 5/2002 | Saito et al. .................... 336/90 |
| 6,672,551 B2 | * | 1/2004 | Rivellino et al. ........... 248/467 |

FOREIGN PATENT DOCUMENTS

| | | | | |
|---|---|---|---|---|
| EP | 924830 A | * | 6/1999 | ............ H02G/3/26 |
| GB | WO 93/04303 | * | 3/1993 | ............ F16G/11/04 |
| JP | 09159067 A | * | 6/1997 | ............. F16L/3/14 |

* cited by examiner

Primary Examiner—Dean A. Reichard
Assistant Examiner—Adolfo Nino
(74) Attorney, Agent, or Firm—L. MeRoy Lillehaugen; Alan D. Kamrath; Nikolai & Mersereau, P.A.

(57) ABSTRACT

A bracket (10) holds a wire (12) adjacent a magnetic surface (15). The bracket (10) includes a retaining member (14) with a magnetic attracting end (16) and a retaining end (18). The retaining member (14) is shaped to accept the wire (12) between the magnetic attracting end (16) and the retaining end (18) while holding the wire (12) adjacent the magnetic surface (15) when the retaining member (14) is held to the magnetic surface (15). The retaining member (14) is formed of a plastic material that is flexible to form a plurality of holding shapes and sturdy to retain one of the plurality of holding shapes to correspond to the magnetic surface (15) of a planar or non-planar configuration. The magnetic attracting end (16) and the retaining end (18) can each include a cavity (46) to receive and fit magnetic attractors (36, 38). The magnetic attractors (36, 38) can each have a length longer than a width and have elongated magnetic forces which are generally perpendicular to an axis extending between the magnetic attracting end (16) and the retaining end (18) of the retaining member (14). In other aspects, the wire (12) is held on a nonmagnetic surface by placing the wire (12) adjacent to the nonmagnetic surface and to first and second magnet attractive fasteners (22, 24) that have been attached to the nonmagnetic surface. While constraining the wire (12) within the bracket (10), the first and second magnetic attractors (36, 38) are attached to the first and second magnet attractive fasteners (22, 24), respectively, thereby holding the wire (12) adjacent the nonmagnetic surface.

21 Claims, 5 Drawing Sheets

BRACKETS AND METHODS FOR HOLDING WIRES UTILIZING MAGNETIC FORCE

BACKGROUND

The present invention generally relates to wire holding and more particularly to methods and brackets for holding wires utilizing magnetic force.

In many applications involving vehicles, farm equipment, and household and industrial applications, one or more electrical wires are routed across a variety of magnetic surfaces of planar and non-planar configurations. The wires can be left dangling in locations where it is impossible and/or undesirable to mount a permanent clip because of moving parts inside, such as on a combine, or when a metal surface may be too thin to support drilled holes or too dense to drill holes for permanent mounting. When pulling a boat trailer or other trailer, wires often are left hanging as the trailer is temporarily wired to the pulling vehicle, and the wires can become tangled or can be damaged by road debris. On truck box frames, the wire routing is difficult because the frame can be on different levels and the surfaces available for mounting the wire can be non-planar or irregular or may be made up of one or more planes. When one is working on electrical equipment or an electrical system, wires can become tangled or may need to be separated for negative and positive charges or for identification purposes. Christmas lights or other decorative lights on wires are removed and replaced on a home or other building year after year and current methods involve removing and replacing fasteners each year, which can be time consuming and can result in damage to the home or other building due to repetitive placement and removal of the fasteners, or can leave empty fasteners protruding from the building while the lights are in storage.

Therefore, there is a need to have a novel bracket and methods for overcoming the deficiencies in prior manners of holding wires in various applications.

SUMMARY

The present invention solves these needs and other problems in the field of wire holding by providing, in a preferred form, a bracket to facilitate holding and routing of wires on a magnetic surface of a planar or non-planar configuration. The bracket includes a retaining member that has a magnetic attracting end and a retaining end. The retaining member is shaped to accept a wire and hold the wire between the magnetic attracting end and the retaining end and adjacent to the magnetic surface when the retaining member is held to the magnetic surface by magnetic force at the magnetic attracting end. The retaining member is formed of a plastic material that is flexible to form a plurality of holding shapes to correspond to the magnetic surface of the planar or non-planar configuration. The plastic material is sturdy to retain one of the plurality of holding shapes while holding the wire adjacent to the magnetic surface of the planar or non-planar configuration. In another aspect of the present invention, the bracket includes one or more grooves formed in the retaining member between the magnetic attracting end and the retaining end. The grooves are adapted to engage the wire while holding the wire adjacent to the magnetic surface.

In other aspects of the present invention, a bracket is provided to facilitate holding and routing of wires on a magnetic surface. The bracket includes a retaining member that has a magnetic attracting end and a retaining end. The retaining member is shaped to accept a wire and hold the wire between the magnetic attracting end and the retaining end and adjacent to the magnetic surface when the retaining member is held to the magnetic surface. The retaining member includes a cavity formed in the magnetic attracting end and in a shape and size to slidingly receive and fit a first magnetic attractor. When the first magnetic attractor is mounted and retained in the cavity, at least a portion of the first magnetic attractor is accessible outside of the cavity so that the first magnetic attractor holds the retaining member to the magnetic surface using magnetic force. In another aspect of the present invention, the bracket also includes a second magnetic attractor on the retaining end of the retaining member to cooperate with the magnetic attracting end to hold the retaining member to the magnetic surface for applications where additional magnetic force is required.

In other aspects of the present invention, a bracket is provided to facilitate holding and routing of wires on a magnetic surface. The bracket includes a retaining member that has a magnetic attracting end and a retaining end. The retaining member is shaped to accept a wire and hold the wire between the magnetic attracting end and the retaining end and adjacent to the magnetic surface when the retaining member is held to the magnetic surface. The retaining member has an axis that extends between the magnetic attracting end and the retaining end. The magnetic attracting end includes a first magnetic attractor that is adapted to attach the retaining member to the magnetic surface. The first magnetic attractor has a length that is longer than a width and has an elongated magnetic force. The length and the elongated magnetic force of the first magnetic attractor are generally perpendicular to the axis of the retaining member. In another aspect of the present invention, the bracket includes a second magnetic attractor, which is attached to the retaining end of the retaining member and in one form, both the first and second magnetic attractors have lengths that are longer than the widths and elongated magnetic forces that are generally perpendicular to the axis of the retaining member.

In other aspects of the present invention, a bracket is provided to facilitate holding and routing of wires on a magnetic surface. The bracket includes a retaining member that has a magnetic attracting end and a retaining end. The retaining member is shaped to accept a wire and hold the wire between the magnetic attracting end and the retaining end and adjacent to the magnetic surface when the retaining member is held to the magnetic surface. The retaining member includes a first magnetic attractor attached to the magnetic attracting end and a second magnetic attractor attached to the retaining end. The first magnetic attractor is of a size different than the second magnetic attractor and both the first and second magnetic attractors are adapted to hold the retaining member to the magnetic surface.

In other aspects of the present invention, a wire is held and routed on a nonmagnetic surface by attaching a first magnet attractive fastener to the nonmagnetic surface. The wire is placed adjacent to the nonmagnetic surface and to the first magnet attractive fastener that is attached to the nonmagnetic surface. While constraining the wire within a bracket, the bracket is magnetically attached to the first magnet attractive fastener that is attached to the nonmagnetic surface and the wire is thereby held adjacent the nonmagnetic surface. The bracket is later removed from the first magnet attractive fastener, with the first magnet attractive fastener remaining attached to the nonmagnetic surface. Removing the bracket allows for removing the wire from adjacent the nonmagnetic surface and for storing of both the removed bracket and the removed wire for future reuse. At a later time, the stored wire is replaced adjacent to the nonmagnetic surface and to the first magnet attractive fastener that is still attached to the nonmagnetic surface. While constraining the replaced wire within the bracket, the bracket is magnetically reattached to the first magnet attractive fastener attached to the nonmagnetic surface to hold the wire adjacent to the nonmagnetic surface. In another aspect of the present invention, the methods include attaching a second magnet attractive fastener to the nonmagnetic surface spaced at a distance from the first magnet attractive fastener to allow for magnetically attaching and reattaching a bracket that includes more than one magnetic attractor. The first magnetic attractor of the bracket is magnetically attached to the first magnet attractive fastener and the second magnetic attractor is magnetically attached to the second magnet attractive fastener to constrain the wire within the bracket and hold the wire adjacent the nonmagnetic surface.

It is thus an object of the present invention to provide novel methods and brackets for holding wires adjacent to a magnetic surface.

It is yet another object of the present invention to provide such novel methods and brackets for holding wires in locations where it is impossible and/or undesirable to mount a permanent clip because of moving parts inside, such as on a combine.

It is yet another object of the present invention to provide such novel methods and brackets for holding wires adjacent to a metal surface which may be too thin to support drilled holes or too dense to drill holes for permanent mounting.

It is yet another object of the present invention to provide such novel brackets that are flexible to fit into a plurality of holding shapes to fit on one of the many different magnetic surfaces of planar or non-planar configurations.

It is yet another object of the present invention to provide such novel brackets that retain a holding shape while securely holding the wire adjacent to the magnetic surface of the planar or non-planar configuration.

It is yet another object of the present invention to provide such novel brackets that have the magnetic attractors mounted and retained inside a cavity that is formed in each end of the retaining member to allow for a strong connection of the magnetic attractor to the retaining member, a strong attachment of the magnetic attractor to the magnetic surface, and a facilitating of manufacture and assembly.

It is yet another object of the present invention to provide such novel brackets that have an elongated magnetic force generally parallel to the wire, to hold the wire securely and prevent tipping of the bracket when there is stress applied, for example, when the wires are routed around corners or running an irregular path.

It is yet another object of the present invention to provide such novel brackets that have ends with magnetic attractors of different sizes to furnish different magnetic forces at each end or to adapt to irregular mounting surfaces.

It is yet another object of the present invention to provide such novel brackets that have at least one groove to engage at least one wire and hold the wire adjacent to the magnetic surface when the bracket is held to the magnetic surface.

It is yet another object of the present invention to provide such novel brackets that are easily installed and removed and that are moveable and reusable to adapt to new configurations of the wire routing and to facilitate the organization and separation of wires during the wiring process and during maintenance or repairs.

It is yet another object of the present invention to provide such novel methods and brackets to magnetically hold wires adjacent to a nonmagnetic surface while allowing for ease in removal and future reuse of the wires and/or bracket.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
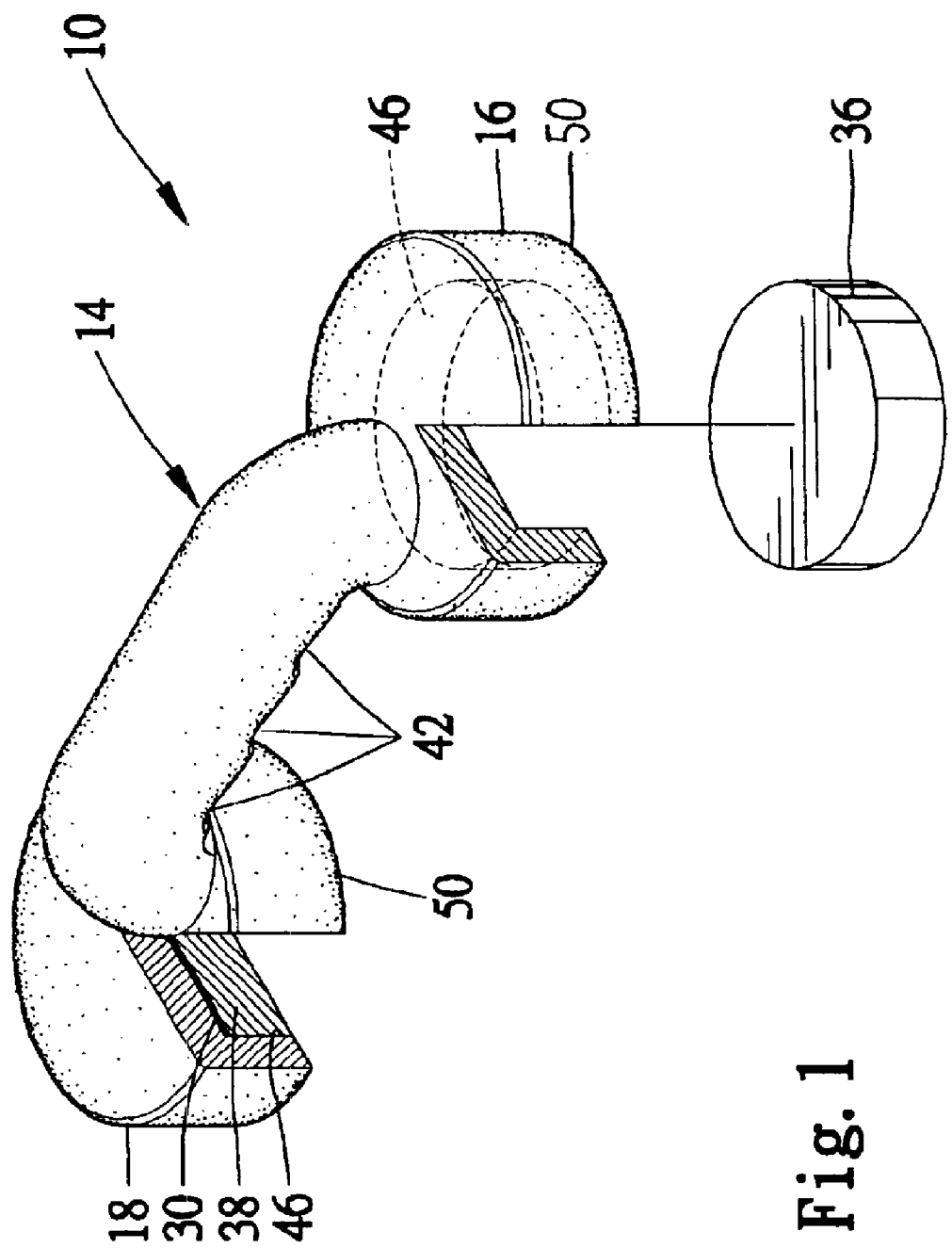
FIG. 1 shows a perspective view of a bracket for holding wires utilizing magnetic force according to the preferred teachings of the present invention.

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, flexibility, sturdiness, and similar requirements will likewise be within the skill of the art after the following description has been read and understood.

Where used in the various figures of the drawings, the same numerals designate the same or similar parts. Furthermore, when the terms "surface," "end," "first" "second," "axis," "length," "width," and similar terms are used herein, it should be understood that these terms have reference only to the structure shown in the drawings as it would appear to a person viewing the drawings and are utilized only to facilitate describing the illustrative embodiments.

DESCRIPTION OF THE PREFERRED EMBODIMENTS

Figure 2:
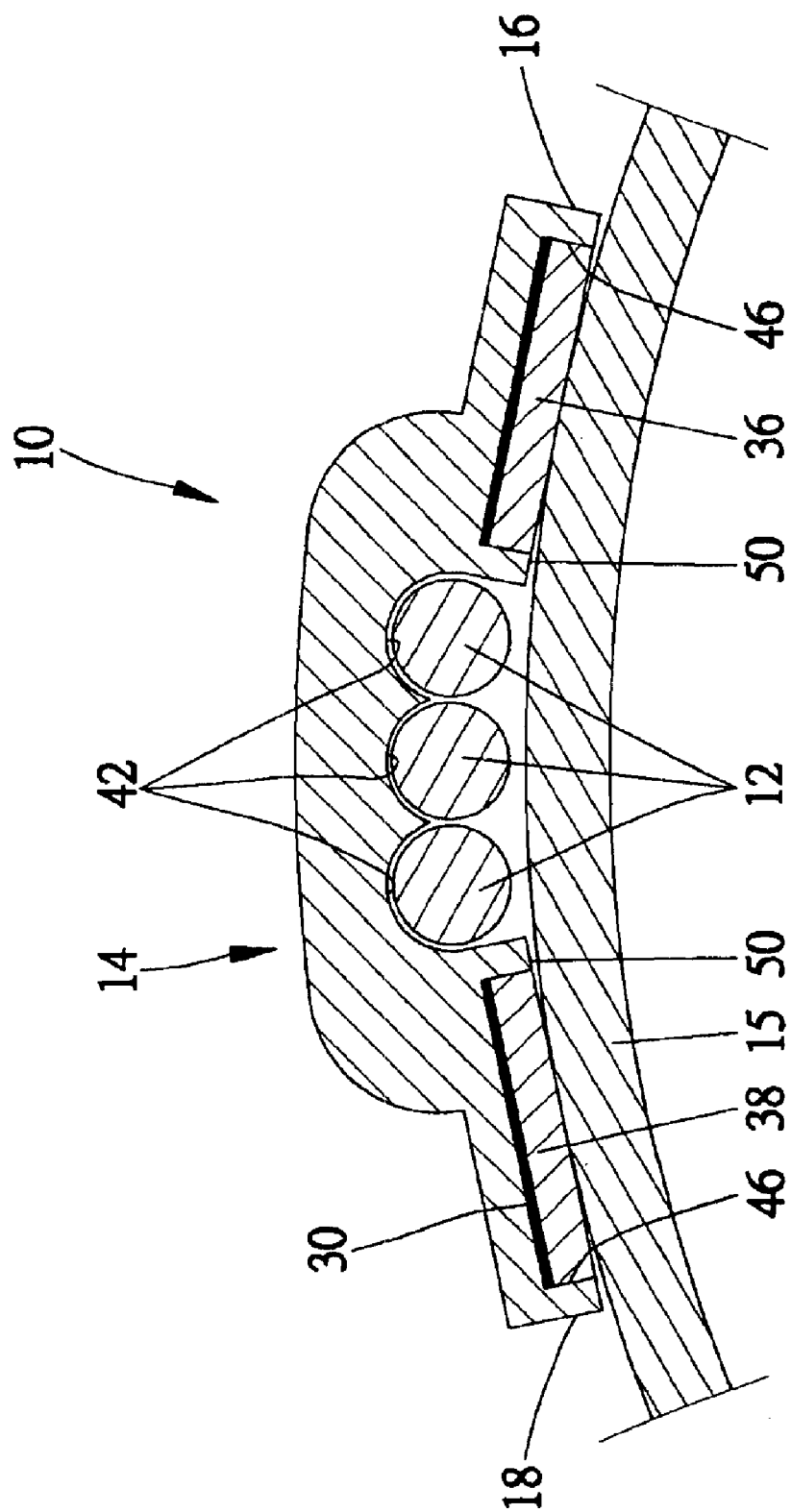
FIG. 2 shows a cross sectional view of the bracket of FIG. 1 utilized in methods according to the preferred teachings of the present invention.
Figure 3:
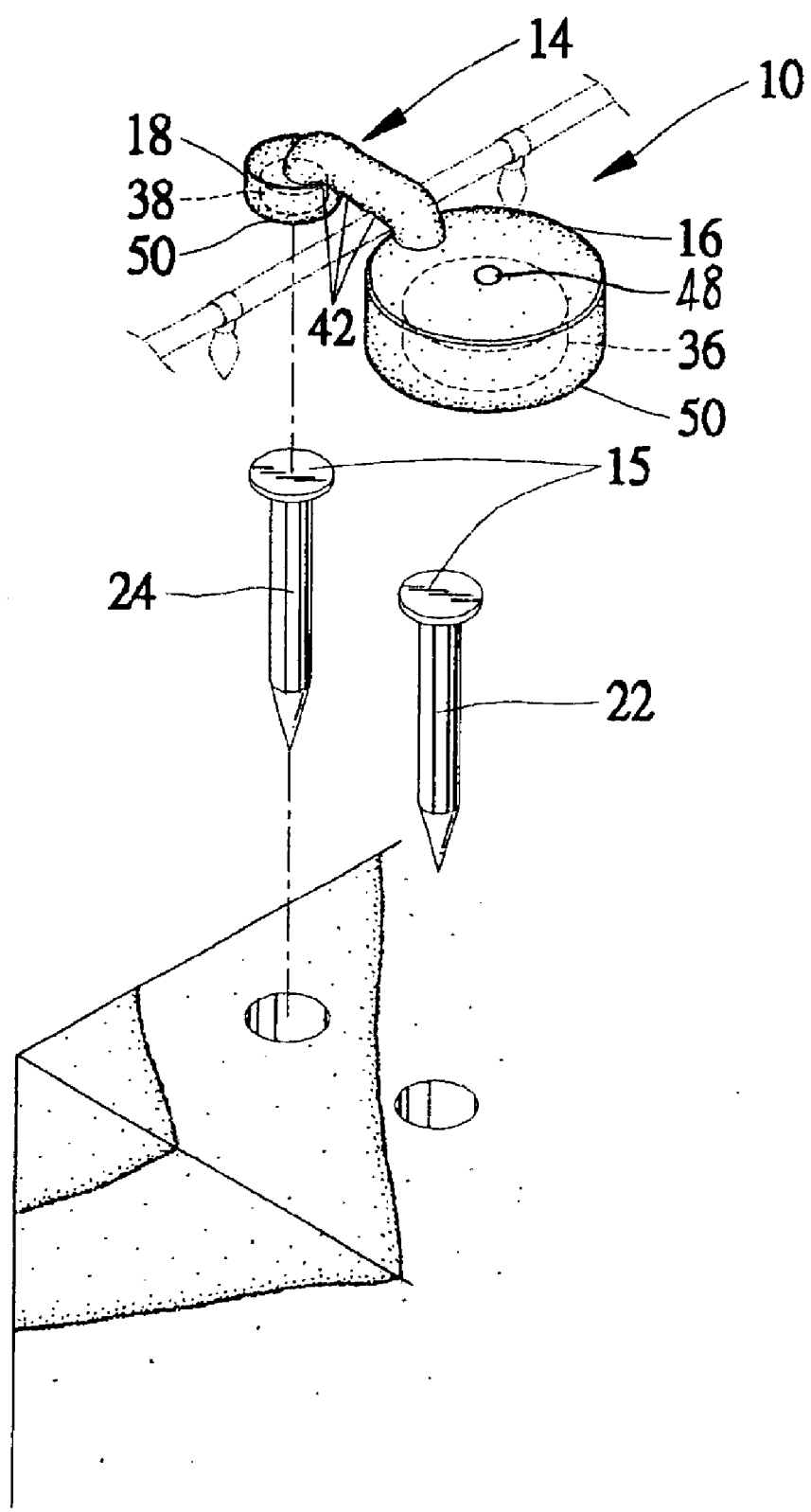
FIG. 3 shows an exploded perspective view of an alternate embodiment of a bracket for holding wires utilizing magnetic force and utilized in methods according to the preferred teachings of the present invention.

Brackets for holding wires adjacent to a magnetic surface utilizing magnetic force, constructed and utilized in methods according to the preferred teachings of the present invention, are shown in the drawings and generally designated 10. The magnetic surface 15 could be of a variety of forms including, but not limited to, metal, paneled metal, plastic coated metal, continuous or non-continuous, or planar or non-planar. Examples of continuous magnetic surfaces 15 are railings, steel siding and steel rain gutters on a house, and examples of non-continuous magnetic surfaces 15 are nails or similar magnet attractive fasteners 22 and 24 added to a nonmetal surface such as shown in FIG. 3, and a generally nonmetal surface with metal elements embedded or attached. An example of a planar magnetic surface 15 is sheet metal or the like. Examples of a non-planar magnetic surfaces 15 are non-planar configurations such as the inside of an L shaped corner, a truck box frame where the frame is on different levels, a cylindrical object such as a tank such as illustrated in FIG. 2, and nails or similar magnet attracting fasteners on surfaces that are at angles other than 180 degrees to each other.

The bracket 10 of the present invention includes a retaining member 14 with a magnetic attracting end 16 and a retaining end 18. The retaining member 14 is shaped to accept a wire 12 between the magnetic attracting end 16 and the retaining end 18 to hold the wire 12 adjacent to the magnetic surface 15. According to the preferred teachings of the present invention, the retaining member 14 has an arcuate shape to accommodate the wire 12 between the magnetic attracting end 16 and the retaining end 18. According to the preferred teachings of the present invention, the bracket 10 has a first magnetic attractor 36 attached to the magnetic attracting end 16 and a second magnetic attractor 38 attached to the retaining end 18. In preferred forms, the first and second magnetic attractors 36 and 38 cooperate to provide magnetic force at both ends of the retaining member 14 to hold the wire 12 adjacent to the magnetic surface 15. It should be appreciated that such an arrangement allows the retaining member 14 to be held securely to the magnetic surface 15 to hold the wire 12 adjacent to the magnetic surface 15.

According to the preferred teachings of the present invention, the retaining member 14 has a mounting surface 50 that is in contact with the magnetic surface 15 when the retaining member 14 is held to the magnetic surface 15 by magnetic force. A cavity 46 is formed in the retaining member 14 at both the magnetic attracting end 16 and the retaining end 18 in preferred forms shown. The cavities 46 have a shape and a size to slidingly receive and fit the first and second magnetic attractors 36 and 38, respectively. In the preferred form, the cavities 46 are formed in the mounting surface 50 of the retaining member 14, and the first and second magnetic attractors 36 and 38 are mounted and retained within the cavities 46. In most preferred forms, at least a portion of the first and second magnetic attractors 36 and 38 are accessible outside of the cavities 46 on the mounting surface 50 of the retaining member 14. It can be appreciated that such an arrangement allows for a strong connection of the magnetic attractors 36 and 38 to the retaining member 14, a strong attachment of the magnetic attractors 36 and 38 to the magnetic surface 15, and a facilitating of manufacture and assembly.

Figure 5:
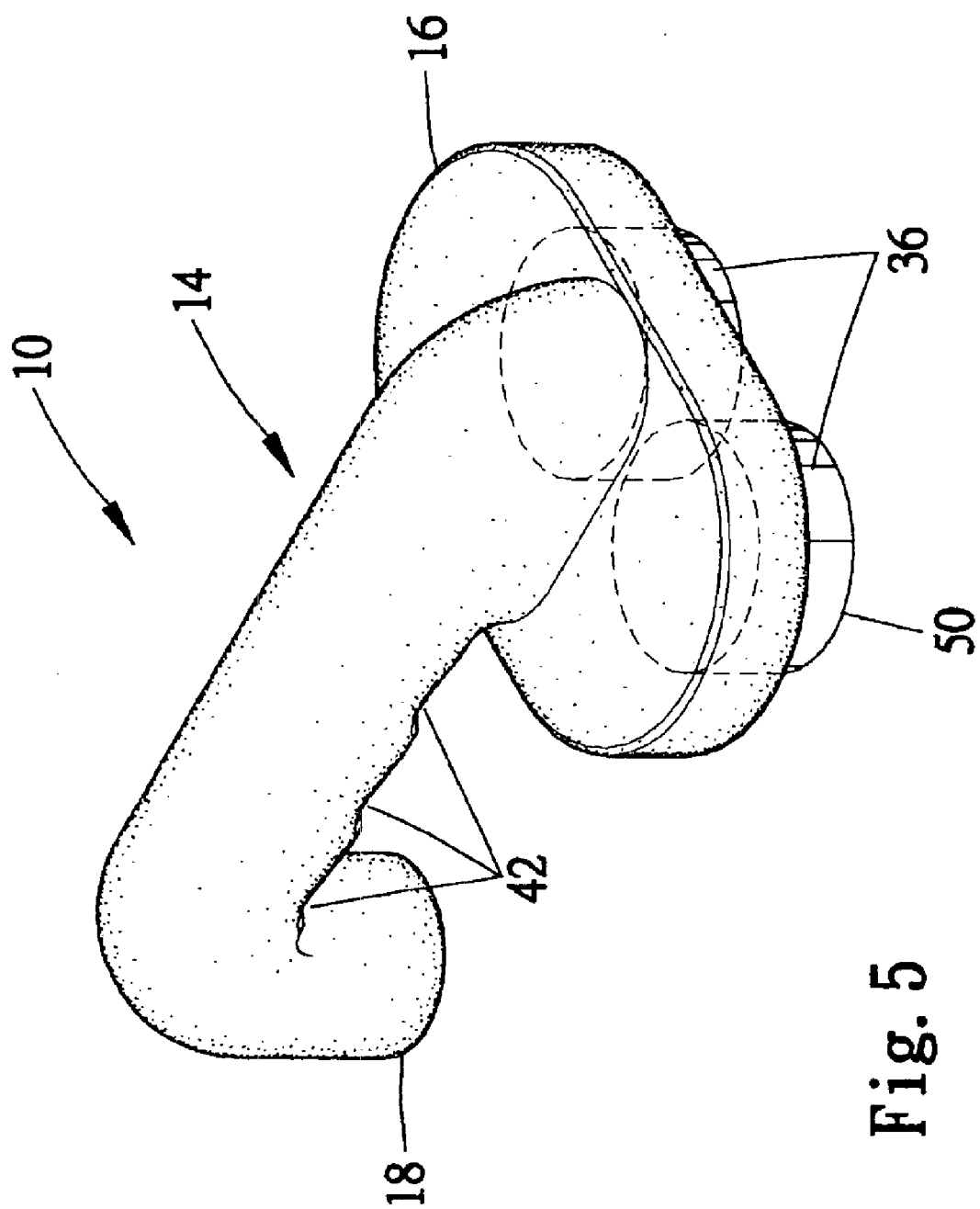
FIG. 5 shows a perspective view of an alternate embodiment of a bracket for holding wires utilizing magnetic force according to the preferred teachings of the present invention.

In most preferred forms, the magnetic attractors 36 and 38 are secured in the cavities 46 of the retaining member 14 by an adhesive 30. In an alternative form according to the preferred teachings of the present invention, the magnetic attractors 38 and/or 36 are secured by a friction fit within cavities 46. In most preferred aspects and especially when friction fit, bleed ports 48 can be provided to allow escape of air and thereby preventing trapping of air within cavities 46 during insertion of magnetic attractors 38 and/or 36. Although shown extending from cavities 46 in a direction opposite to mounting surface 50 in FIG. 3, bleed ports 48 can have different orientations, forms, and the like according to the teachings of the present invention. In still a further alternative form according to the teachings of the present invention, the magnetic attractors 38 and/or 36 are mounted directly to the retaining end 18 and/or the magnetic attracting end 16 as shown in FIG. 5, respectively, by the adhesive 30 with no cavities 46 being formed in the retaining member 14. According to the teachings of the present invention, the magnetic attractors 36 and 38 could be secured to the retaining member 14 in other manners. As an example, the magnetic attractors 36 and 38 could be secured by fasteners in conjunction with, or instead of, the adhesive 30.

Figure 4:
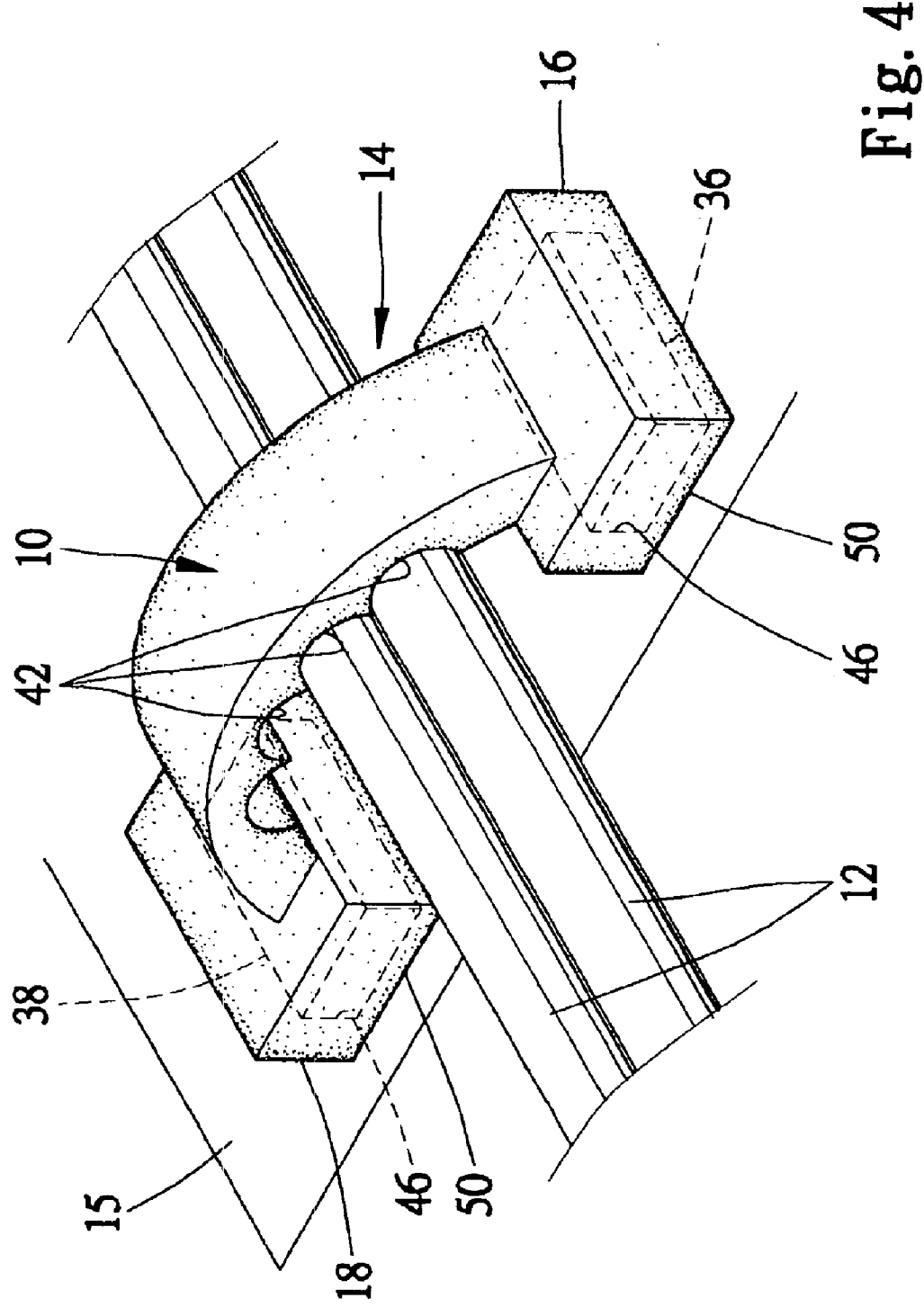
FIG. 4 shows a perspective view of a bracket for holding wires utilizing magnetic force and utilized in methods according to the preferred teachings of the present invention.

In preferred forms according to the preferred teachings of the present invention, the first and second magnetic attractors 36 and 38 are magnets. In a preferred form shown in FIG. 4, the magnets have lengths longer than widths to provide elongated magnetic attractors 36 and 38 on both ends of the retaining member 14. The lengths of the magnets are generally perpendicular to an axis that extends between the magnetic attracting end 16 and the retaining end 18 of the retaining member 14 to provide an elongated magnetic force. The elongated magnetic force prevents the retaining member 14 from tipping when there is stress applied, for example, when the wire 12 is routed around corners or running an irregular path. In the preferred form shown in FIG. 4 according to the preferred teachings of the present invention, the magnetic attractors 36 and 38 are magnets that have rectangular cross sections with lengths that are perpendicular to the axis of the retaining member 14. In further aspects of the invention, the bracket 10 includes the second magnetic attractor 38 of a size different than the first magnetic attractor 36, as shown in FIG. 3, to furnish different magnetic forces at each end or to adapt to irregular magnetic surfaces 15. As will be recognized by those skilled in the art, alternate magnetic attractors 36 and 38 could be used to provide the elongated magnetic force, including but not limited to, other shapes of magnets, magnetic attractors 36 and 38 including two or more magnets each as shown in FIG. 5, or the like, without departing from the spirit or scope of the present invention.

In the preferred form, the magnetic attractors 36 and 38 are located on the mounting surface 50 of the retaining member 14 and contact the magnetic surface 15 when the retaining member 14 is held to the magnetic surface 15 by magnetic force. Locating the magnetic attractors 36 and 38 on the mounting surface 50 allows for optimum magnetic force due to proximity of the magnetic attractors 36 and 38 and the magnetic surface 15. However as will be recognized by those skilled in the art, alternate locations of the magnetic attractors 36 and 38, such as imbedded within the retaining member 14 or on an opposite side of the retaining member 14 from the mounting surface 50, may be used without departing from the spirit or scope of the present invention.

In an alternative form shown in FIG. 5 according to the preferred teachings of the present invention, the bracket 10 has only the first magnetic attractor 36 attached to the magnetic attracting end 16. The first magnetic attractor 36 cooperates with the retaining end 18 to allow the retaining member 14 to hold the wire 12 while mounted on a narrow magnetic surface 15, such as a strip of sheet metal, or where the magnetic surface 15 is uneven.

According to the preferred teachings of the present invention, the retaining member 14 is formed of a plastic material such as, but not limited to, a copolymer polypropylene, that is flexible to form a plurality of holding shapes to correspond to the magnetic surface 15 of a planar or non-planar configuration. For example, the retaining member 14 may adapt to the magnetic surface 15 that is planar such as sheet metal, or the magnetic surface 15 that is non-planar such as the inside of an L shaped corner, the truck box frame where the frame is on different levels, the cylindrical object such as a tank as shown in FIG. 2, or nails on nonmetal surfaces that are at angles other than 180 degrees, such as at a right angle, to each other. According to the preferred teachings of the present invention, the plastic material is sturdy to retain one of the plurality of holding shapes while holding the wire 12 adjacent to the magnetic surface 15 of the planar or non-planar configuration. It should be appreciated that such a construction allows for the retaining member 14 to adapt to the magnetic surface 15 of the planar or non-planar configuration, yet still hold the wire 12 securely on the magnetic surface 15.

According to the preferred teachings of the present invention, a plurality of grooves 42 are formed in the retaining member 14 between the magnetic attracting end 16 and the retaining end 18. The grooves 42 are adapted to engage the wires 12 when the wires 12 are held between the retaining member 14 and the magnetic surface 15. In other aspects of the present invention, the bracket 10 has a single groove 42 formed in the retaining member 14 to engage a wire 12 between the magnetic attracting end 16 and the retaining end 18 of the retaining member 14 and adjacent to the magnetic surface 15.

In other aspects of the present invention according to the preferred teachings, methods are provided to facilitate holding and routing of wires 12 on a nonmagnetic surface by altering the nonmagnetic surface to provide the magnetic surface 15 of a non-continuous configuration on which to attach the magnetic bracket 10. According to the preferred teachings and as shown in FIG. 3, the methods include attaching first and second magnet attractive fasteners 22 and 24 to the nonmagnetic surface with the second magnet attractive fastener 24 spaced from the first magnet attractive fastener 22 to correspond to a spacing between the first magnetic attractor 36 and the second magnetic attractor 38 of the bracket 10. In the preferred form, attaching the first and second magnet attractive fasteners 22 and 24 includes, but is not limited to, driving a nail and a second nail into a wooden surface, such as a building. The wire 12 can be placed adjacent to the first and second magnet attractive fasteners 22 and 24 and to the nonmagnetic surface. The wire 12 is constrained within the bracket 10 and held adjacent to the magnetic surface 15 of the non-continuous configuration when the first magnetic attractor 36 is magnetically attached to the first magnet attractive fastener 22 and the second magnetic attractor 38 is magnetically attached to the second magnet attractive fastener 24.

According to the preferred teachings of the present invention, the bracket 10 can be easily removed from the first and second magnet attractive fasteners 22 and 24, with the first and second magnet attractive fasteners 22 and 24 remaining attached to the nonmagnetic surface for future reuse. Removing the bracket 10 allows for the removal of the wire 12 and for storing of the removed bracket 10 and the removed wire 12. The stored wire 12 can be replaced adjacent to the nonmagnetic surface and to the first and second magnet attractive fasteners 22 and 24 that are still attached to the nonmagnetic surface. The bracket 10 can be magnetically reattached to the first and second magnet attractive fasteners 22 and 24 to constrain the replaced wire 12 and to hold the replaced wire 12 adjacent to the magnetic surface 15 of the non-continuous configuration. It can be appreciated that such methods allow for temporary display of wired Christmas lights, or the like, with ease of removing them for off-season storage, and with a simple way to hang them again the following year, as the first and second magnet attractive fasteners 22 and 24 are already in place and the bracket 10 is easily attached to the first and second magnet attractive fasteners 22 and 24 by magnetic force to again display the wired Christmas lights adjacent to the nonmagnetic surface.

In other aspects of the invention the methods include attaching only the first magnet attractive fastener 22 to the nonmagnetic surface to provide the magnetic surface 15 of the non-continuous configuration to allow attachment of the bracket 10 including only the first magnetic attractor 36. As will be recognized by those skilled in the art, the methods of the present invention allow for the use of other magnetic brackets than the bracket 10 without departing from the spirit or scope of the present invention.

Now that the basic teachings of the present invention have been explained, many extensions and variations will be obvious to one having ordinary skill in the art. For example, although the bracket 10 according to the preferred teachings of the present invention has been shown as including several features in combination believed to produce synergistic results, such features can be utilized singly and in other combinations with other features according to the teachings of the present invention.

Furthermore, although the retaining member 14 shown in the most preferred form includes the magnetic attracting end 16 and the retaining end 18 being at opposite ends and on the mounting surface 50 that contacts the magnetic surface 15, it can be appreciated that the retaining member 14 and its ends 16 and 18 could be of different forms, sizes, shapes and orientations than shown and to each other according to the teachings of the present invention.

Similarly, while in the preferred form according to the preferred teachings of the present invention, the retaining member 14 is formed of the plastic material, such as copolymer polypropylene, which is believed to be advantageous for many reasons including its ability to withstand environmental conditions such as heat, cold, dirt and liquids, the retaining member 14 could be formed from other materials that have similar flexibility and sturdiness characteristics according to the teachings of the present invention.

Likewise, while in the most preferred form according to the preferred teachings of the present invention, the magnetic attractors 36 and 38 are magnets, such as, but not limited to, neodymium nickel plated magnets or stainless steel magnets, which are believed to be advantageous for many reasons including resistance to rust, the magnetic attractors 36 and 38 could be formed from other magnetic attracting material according to the teachings of the present invention.

Thus since the invention disclosed herein may be embodied in other specific forms without departing from the spirit of general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and ranges of equivalency of the claims are intended to be embraced therein.

What is claimed is:

1. Bracket for holding a wire adjacent to a magnetic surface of a planar or non-planar configuration comprising:

a retaining member having a magnetic attracting end and a retaining end, with the retaining member shaped to accept the wire between the magnetic attracting end and the retaining end, with the wire held adjacent to the magnetic surface of the planar or non-planar configuration and constrained between the magnetic surface and the retaining member and also between the magnetic attracting end and the retaining end with the spacing between the retaining end and the magnetic surface being sized to prohibit insertion or removal of the wire when the magnetic attracting end is held to the magnetic surface of the planar or non-planar configuration by magnetic force;

with the retaining member formed of a plastic material that is flexible to form a plurality of holding shapes to correspond to the magnetic surface of the planar or non-planar configuration; and with the plastic material being sturdy to retain one of the plurality of holding shapes while holding the wire adjacent to the magnetic surface of the planar or non-planar configuration.

2. The bracket of claim 1 with the magnetic attracting end including a magnetic attractor to hold the retaining member to the magnetic surface of the planar or non-planar configuration.

3. The bracket of claim 2 with the magnetic attractor being at least one magnet.

4. The bracket of claim 2 further comprising, in combination: an adhesive securing the magnetic attractor to the magnetic attracting end of the retaining member.

5. The bracket of claim 2 with the magnetic attractor being two magnets.

6. The bracket of claim 1 further comprising, in combination: a groove formed in the retaining member between the magnetic attracting end and the retaining end, with the groove adapted to engage the wire.

7. The bracket of claim 1 with the retaining member having an arcuate shape between the magnetic attracting end and the retaining end, with the arcuate shape allowing the wire to be held between the retaining member and the magnetic surface of the planar or non-planar configuration, with the retaining end being free of attachment to the magnetic surface by magnetic force.

8. The bracket of claim 1 further comprising, in combination: a magnetic attractor attached to the magnetic attracting end of the retaining member, with the magnetic attractor adapted to hold the retaining member to the magnetic surface of the planar or non-planar configuration, with the magnetic attracting end including a cavity having a shape and a size to slidingly receive and fit the magnetic attractor with at least a portion of the magnetic attractor being accessible outside of the cavity when the magnetic attractor is mounted and retained within the cavity, with the retaining member having an axis extending between the magnetic attracting end and the retaining end, with the magnetic attractor having a length and a width, with the length being longer than the width, with the magnetic attractor having an elongated magnetic force, with the length of the magnetic attractor and the elongated magnetic force being generally perpendicular to the axis of the retaining member.

9. Bracket for holding a wire adjacent to a magnetic surface of a planar or non-planar configuration comprising, in combination: a retaining member having a magnetic A attracting end and a retaining end, with the retaining member shaped to accept the wire between the magnetic attracting end and the retaining end, with the wire held adjacent to the magnetic surface of the planar or non-planar configuration and constrained between the magnetic attracting end and the retaining end when the magnetic attracting a magnetic end is held to the magnetic surface of the planar or non-planar configuration by magnetic force; with the retaining member formed of a plastic material that is flexible to form a plurality of holding shapes to correspond to the magnetic surface of the planar or non-planar configuration; with the plastic material being sturdy to retain one of the plurality of holding shapes while holding the wire adjacent to the magnetic surface of the planar or non-planar configuration; and attractor attached to the retaining end of the retaining member to hold the wire adjacent to the magnetic surface of the planar or non-planar configuration in cooperation with the magnetic attracting end of the retaining member.

10. The bracket of claim 9 with the magnetic attractor having a size different than the magnetic attracting end of the retaining member.

11. The bracket of claim 9 with the retaining member having an arcuate shape between the magnetic attracting end and the retaining end, with the arcuate shape allowing the wire to be held between the retaining member and the magnetic surface of the planar or non-planar configuration, with the magnetic attracting end and the magnetic attractor located intermediate the retaining member and the magnetic surface of the planar or non-planar configuration and with the wire constrained between the magnetic attracting end and the magnetic attractor when the retaining member is held to the magnetic surface of the planar or non-planar configuration.

12. The bracket of claim 9 with the retaining member having an axis extending between the magnetic attracting end and the retaining end, with both the magnetic attracting end and the magnetic attractor having a length and a width, with the length being longer than the width, with both the magnetic attracting end and the magnetic attractor having an elongated magnetic force, and with the lengths and the elongated magnetic forces of the magnetic attracting end and the magnetic attractor being generally perpendicular to the axis of the retaining member.

13. Bracket for holding a wire adjacent to a magnetic surface comprising, in combination:

a retaining member having a magnetic attracting end and a retaining end, with the retaining member shaped to accept the wire between the magnetic attracting end and the retaining end, with the magnetic attracting end of the retaining member including a cavity; and a first magnetic attractor attached to the magnetic attracting end of the retaining member, with the first magnetic attractor slidingly fitted in the cavity in the magnetic attracting end of the retaining member, with the cavity having a shape and a size to receive and fit the first magnetic attractor with at least a portion of the first magnetic attractor being accessible outside of the cavity when the first magnetic attractor is mounted and retained within the cavity, with the first magnetic attractor adapted to hold the retaining member to the magnetic surface by magnetic force, with the wire held adjacent to the magnetic surface and constrained between the magnetic attracting end and the retaining end when the magnetic attracting end is held to the magnetic surface by the first magnetic attractor.

14. The bracket of claim 13 with the retaining member further including a mounting surface on the magnetic attracting end, with the mounting surface contacting the magnetic surface when the retaining member is held to the magnetic surface by magnetic force, with the cavity being formed in the mounting surface of the magnetic attracting end of the retaining member.

15. The bracket of claim 13 further comprising, in combination: a second magnetic attractor attached to the retaining end of the retaining member, with the second magnetic attractor cooperating with the first magnetic attractor to hold the retaining member to the magnetic surface by magnetic force.

16. Bracket for holding a wire adjacent to a magnetic surface comprising, in combination:

a retaining member having a magnetic attracting end and a retaining end, with the retaining member shaped to accept the wire between the magnetic attracting end and the retaining end;

a first magnetic attractor attached to the magnetic attracting end; and a second magnetic attractor attached to the retaining end of the retaining member, with the first magnetic attractor being a size different than the second magnetic attractor, with the first and second magnetic attractors holding retaining member to the magnetic surface by magnetic force, with the wire held adjacent to the magnetic surface and constrained between the magnetic attracting end and the retaining end when the retaining member is held to the magnetic surface by the first and second magnetic attractors.

17. Method comprising:

attaching a first magnet attractive fastener to a nonmagnetic surface;

placing a wire adjacent the nonmagnetic surface and the first magnet attractive fastener attached to the nonmagnetic surface;

constraining the wire within a bracket;

magnetically attaching the bracket to the first magnet attractive fastener attached to the nonmagnetic surface while the wire is constrained within the bracket to hold the wire adjacent to the nonmagnetic surface;

removing the bracket attached to the first magnet attractive fastener, with the first magnet attractive fastener remaining attached to the nonmagnetic surface;

removing the wire from adjacent the nonmagnetic surface and the first magnet attractive fastener attached to the nonmagnetic surface after the bracket is removed from the first magnet attractive fastener;

storing the removed wire and the removed bracket;

replacing the stored wire adjacent the nonmagnetic surface and the first magnet attractive fastener attached to the nonmagnetic surface;

constraining the replaced wire within the removed bracket; and magnetically reattaching the removed bracket to the first magnet attractive fastener attached to the nonmagnetic surface while the replaced wire is constrained within the removed bracket to hold the wire adjacent to the nonmagnetic surface.

18. The method of claim 17 with constraining the wire comprising constraining the wire within the bracket including a retaining member, with the retaining member having a magnetic attracting end and a retaining end, with the wire being constrained between the magnetic attracting end and the retaining end, with magnetically attaching the bracket comprising magnetically attaching the magnetic attracting end of the bracket to the first magnet attractive fastener.

19. The method of claim 17 further comprising attaching a second magnet attractive fastener to the nonmagnetic surface spaced from the first magnet attractive fastener, with constraining the wire comprising constraining the wire within a bracket including first and second magnetic attractors, with magnetically attaching the bracket comprising magnetically attaching the first magnetic attractor to the first magnet attractive fastener and magnetically attaching the second magnetic attractor to the second magnet attractive fastener.

20. The method of claim 17 with attaching the first magnet attractive fastener comprising driving a nail into the nonmagnetic surface.

21. The method of claim 17 with placing the wire adjacent the nonmagnetic surface comprising placing the wire in the form of Christmas light wires adjacent the nonmagnetic surface.

* * * * *

UNITED STATES PATENT AND TRADEMARK OFFICE
CERTIFICATE OF CORRECTION

PATENT NO. : 6,855,890 B1
DATED : February 15, 2005
INVENTOR(S) : Richard Vasicheck It is certified that error appears in the above-identified patent and that said Letters Patent is hereby corrected as shown below:

Column 8,
Line 62, insert -- , -- after the word "end" and before the word "with";

Column 9,
Line 50, delete "A";
Line 65, after "and", insert -- a magnetic --;

Column 11,
Line 5, insert -- the -- between the words "holding" and "retaining".

Signed and Sealed this

Twenty-sixth Day of April, 2005

JON W. DUDAS
*Director of the United States Patent and Trademark Office*